Aug. 4, 1959 E. TIGER 2,898,409
TAPE TRANSPORTING DEVICE FOR USE WITH CARTRIDGES
Filed March 6, 1956 8 Sheets-Sheet 1
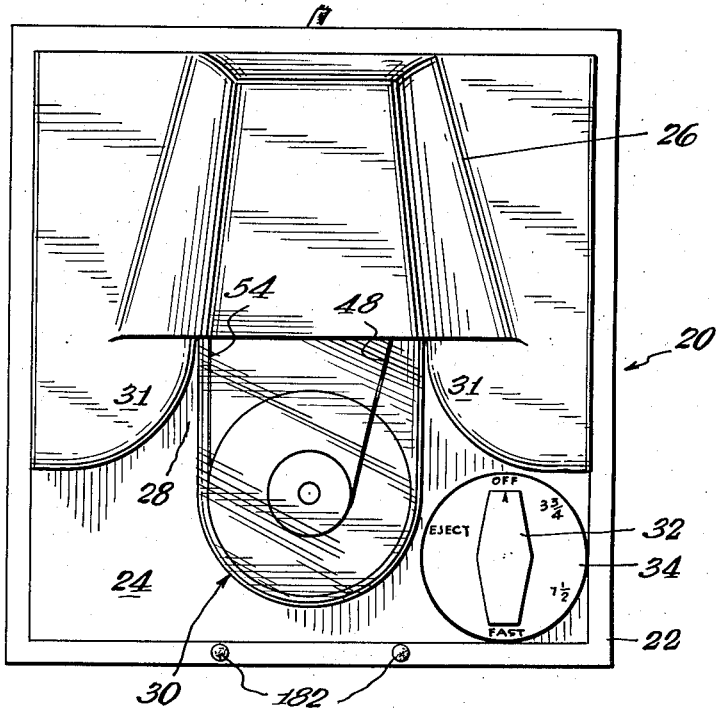
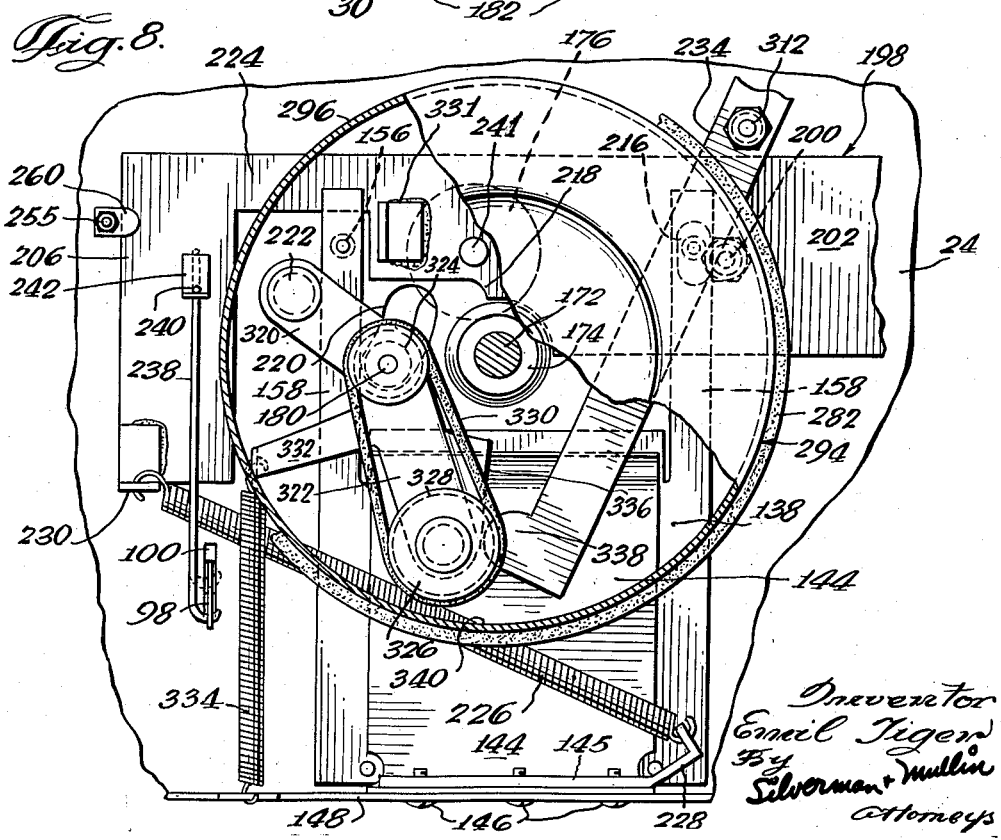
Inventor
Emil Tiger
By Silverman + Mullin
Attorneys

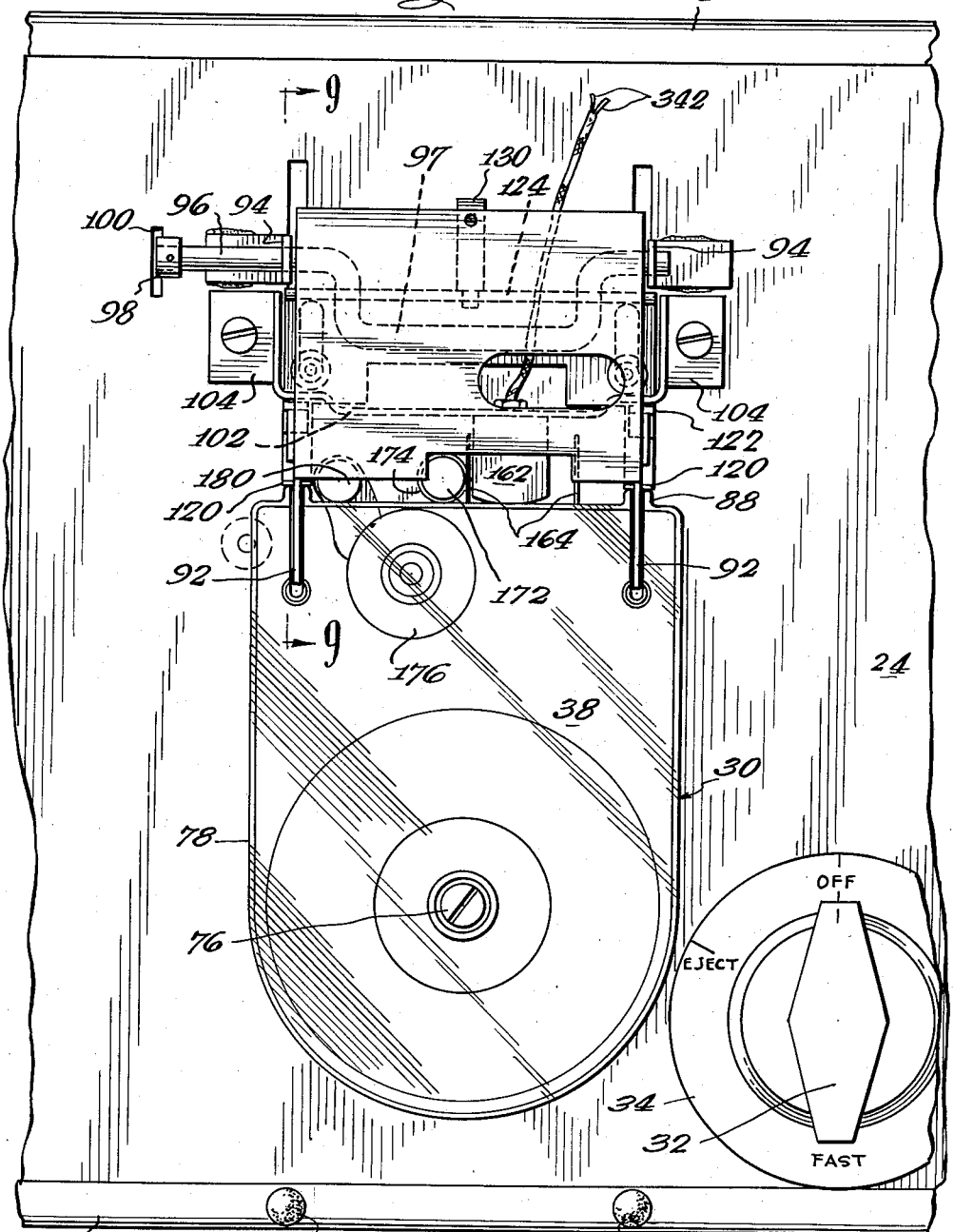

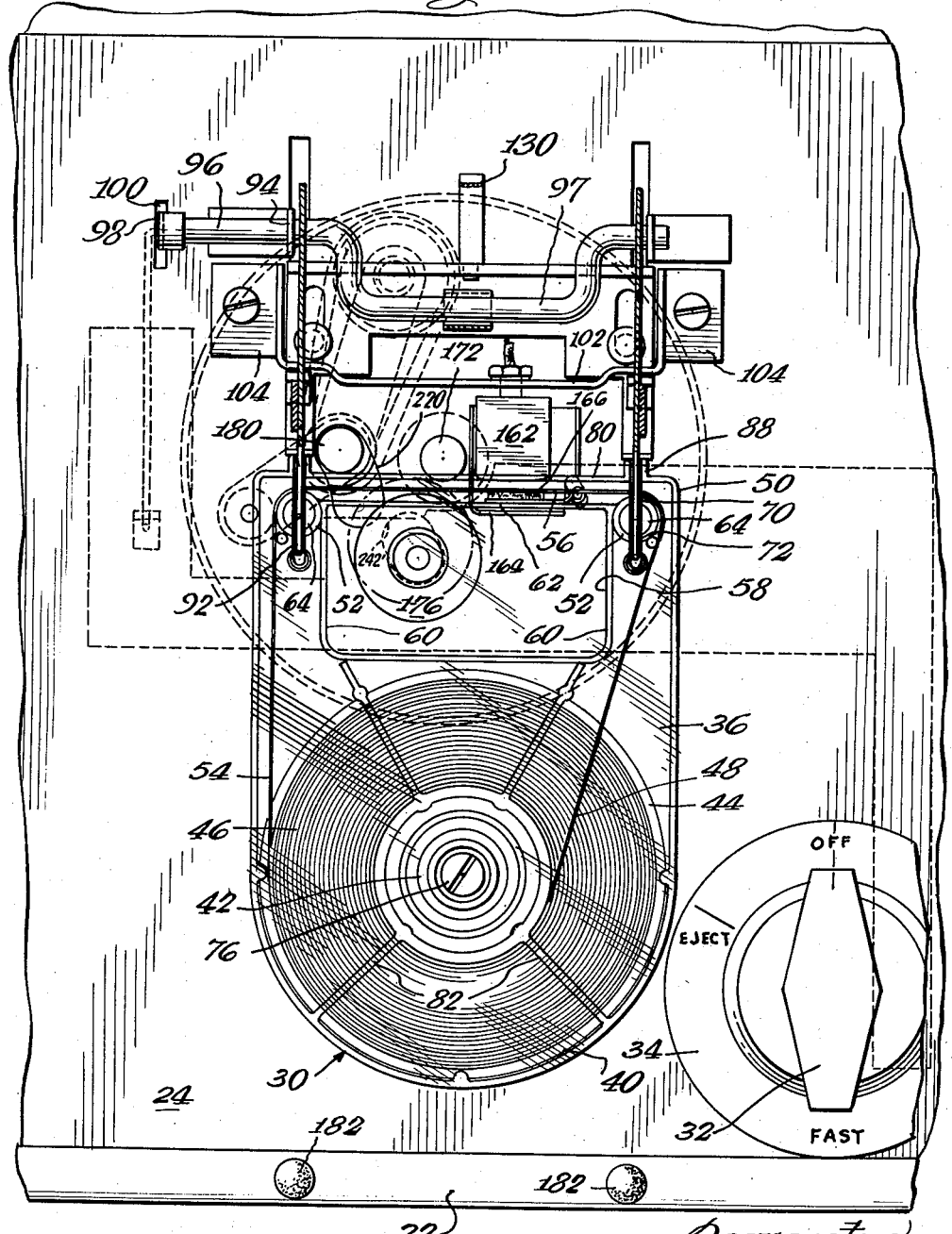

Aug. 4, 1959  E. TIGER  2,898,409
TAPE TRANSPORTING DEVICE FOR USE WITH CARTRIDGES
Filed March 6, 1956  8 Sheets-Sheet 4

Inventor
Emil Tiger
By Silverman & Mullin
Attorneys

Aug. 4, 1959   E. TIGER   2,898,409
TAPE TRANSPORTING DEVICE FOR USE WITH CARTRIDGES
Filed March 6, 1956   8 Sheets-Sheet 6

Inventor
Emil Tiger
By Silverman & Mullin
Attorneys

Aug. 4, 1959　　　　　　　E. TIGER　　　　　　2,898,409
TAPE TRANSPORTING DEVICE FOR USE WITH CARTRIDGES
Filed March 6, 1956　　　　　　　　　　　　　8 Sheets-Sheet 7
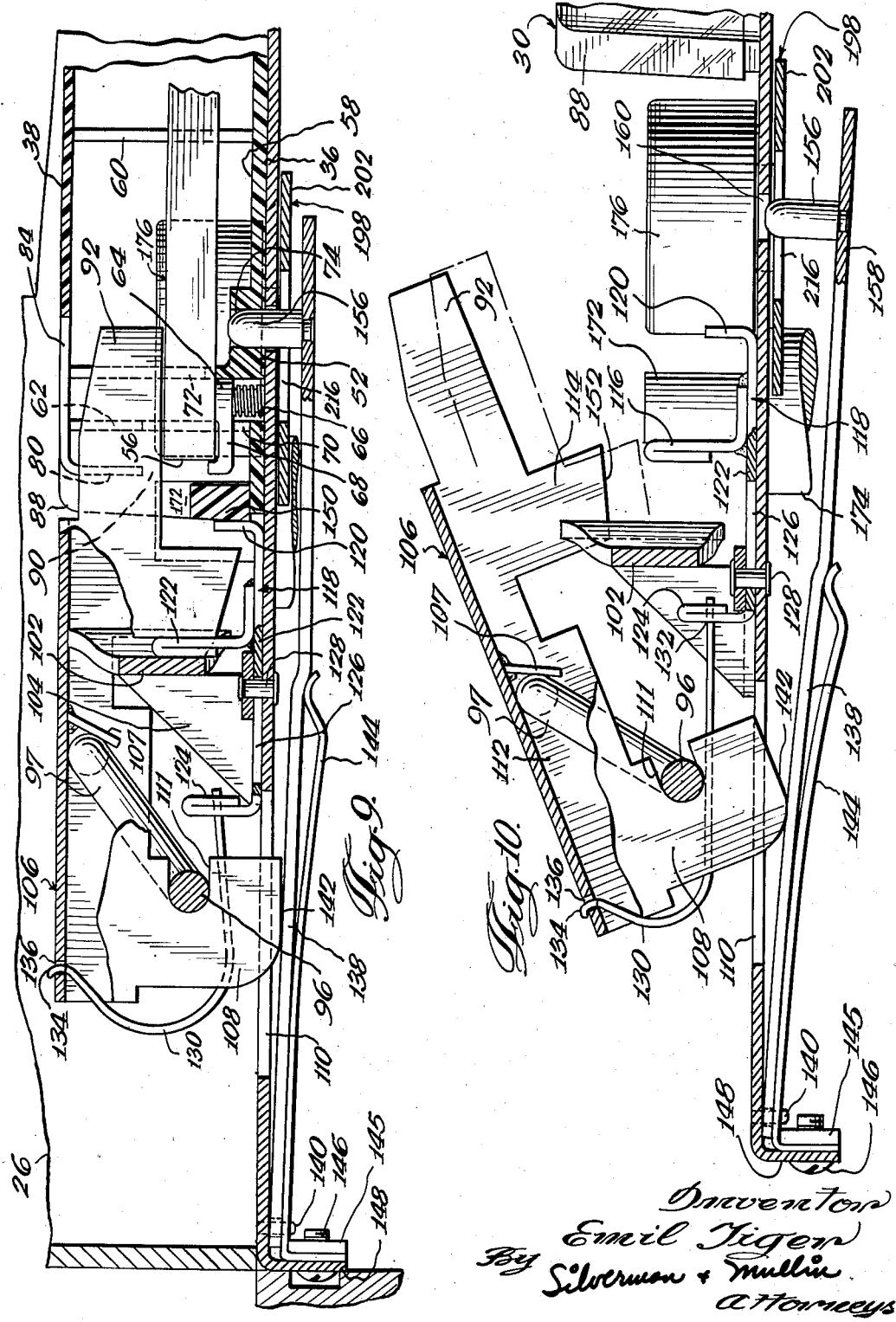

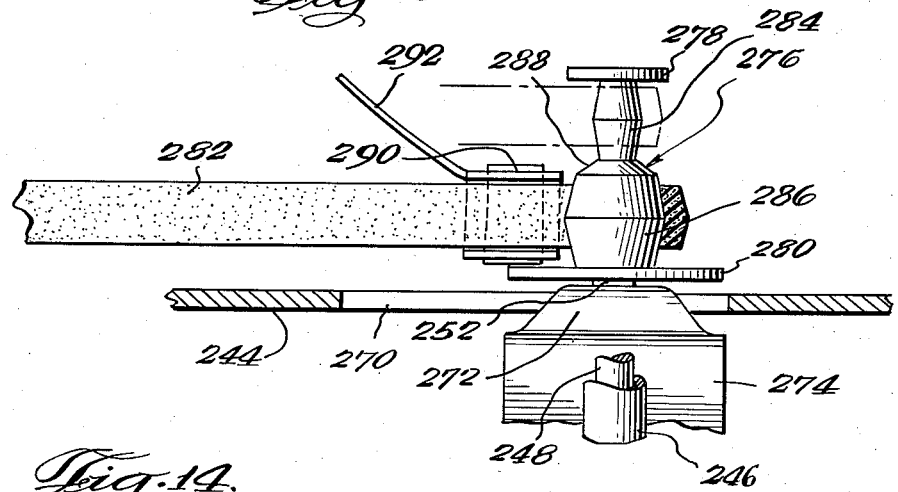
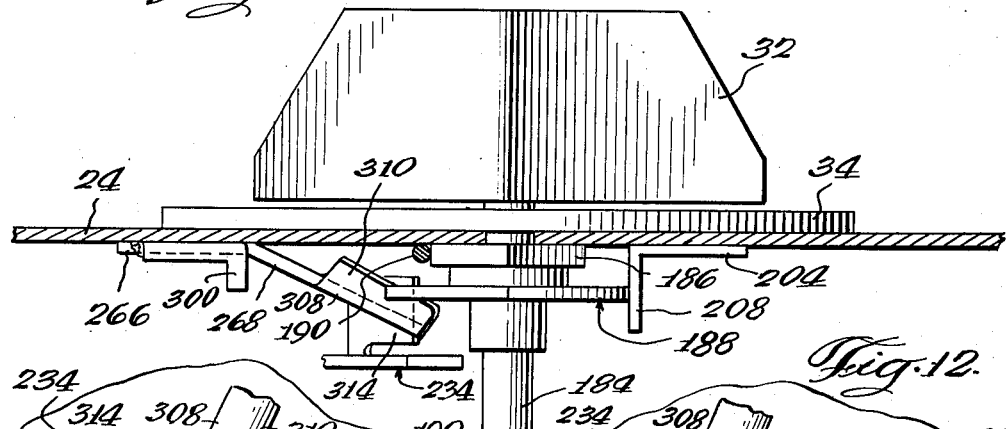
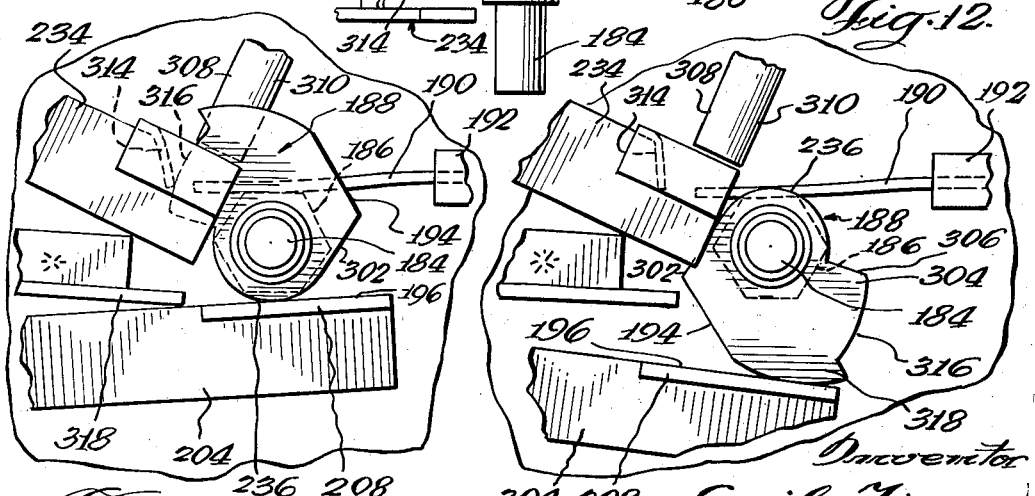

United States Patent Office 2,898,409
Patented Aug. 4, 1959

2,898,409

TAPE TRANSPORTING DEVICE FOR USE WITH CARTRIDGES

Emil Tiger, Skokie, Ill., assignor to Sound, Inc., Chicago, Ill., a corporation of Illinois Application March 6, 1956, Serial No. 569,817

27 Claims. (Cl. 179—100.2)

This invention relates generally to tape recording and play-back devices and more particularly is concerned with a tape transporting device for use with cartridges.

The apparatus with which this invention is concerned differs markedly from previously known devices in that previous devices have utilized so-called magnetic tapes which are wound and unwound from reels and which required threading operations to dispose the tape properly with respect to driving means, idling wheels and magnetic heads. The device of this invention is intended to be used with a cartridge in the form of a completely contained housing having a coil of tape therein and in which the tape is continuous, being removed from the center of the coil and rewound upon the circumference of the coil simultaneously. A section of the tape is disposed at the front end of the cartridge and arranged in a protective channel-like formation but is adapted to be moved out of the channel-like formation in position for play-back or record.

While the invention is illustrated herein as being embodied in a tape transporting mechanism for playing back pre-recorded tapes, it is equally applicable to devices which have provision for recording upon the tapes as well.

The principal object of the invention lies in the provision of a highly compact and efficiently operating tape transporting device for use with cartridges which has novel cartridge holding and ejecting means, novel operating and control means, and novel drive and speed change means.

A further object of the invention is to provide a tape transporting device or apparatus in which there is only one knob which controls the speed at which the tape moves past the magnetic head for reproducing intelligence recorded upon the tape at several speeds; the same control being movable to a position where the tape is rotated at a fast speed without playing back the recorded intelligence as for example, in repositioning the tape; and in which the same control knob is used to effect ejection of the cartridge from the apparatus.

Still a further object of the invention is to provide apparatus of the character described which has a tape locking and positioning means such that the manual insertion of the cartridge into a defined throat automatically locks the cartridge in position, lowers the section of the tape which is to be disposed against the magnetic play-back head, and positions the tape so that on operation of the control knob the desired transportation of the tape past the head will be achieved.

Still a further object of the invention is the provision in a tape transporting device of a novel mechanical linkage for changing the speed at which the tape is transported past the recording head, the means for accomplishing the speed change being extremely simple and fool-proof, and operable through the shifting of a belt in a novel and ingenious manner.

A further object of the invention lies in the provision of various components of the apparatus which enable the single control knob to control the various speeds and achieve the various mechanism connections required to perform the desired functions.

Certain specific objects are concerned with the provision of the novel linkage for ejecting the cartridge; novel means for transmitting the rotation of the flywheel to a rotating belt for fast movement of the tape as in winding the same to a new position.

Many other objects will occur to those skilled in the art as the description of the invention proceeds, in connection with which there has been illustrated and described in considerable detail a preferred embodiment of the invention.

In the drawings:

Fig. 1 is a top plan view of the tape transporting device of the invention with a cartridge shown in operative position and the control knob being set in "off" position.

Fig. 2 is a fragmentary top plan view of the tape transporting device on an enlarged scale similar to that of Fig. 1 but with the protective throat-forming shroud removed.

Fig. 3 is a view similar to that of Fig. 2 but with portions broken away to illustrate details of the mechanism.

Fig. 8 is a fragmentary bottom plan view with portions broken away to show the details of the drive mechanism for the apparatus.

Fig. 9 is a sectional view on a greatly enlarged scale taken generally along the line 9—9 of Fig. 2 and in the indicated direction.

Fig. 10 is a sectional view through the cartridge receiving and ejecting mechanism and showing the apparatus in position to receive the cartridge or just after having ejected one.

Fig. 11 is a bottom plan view of the control cam, the same being shown in position to drive the tape at 7½ inches per second.

Fig. 12 is a similar view but showing the cam in position to eject the cartridge.

Fig. 13 is a fragmentary sectional view through the speed change mechanism with portions shown in elevation.

Fig. 14 is a sectional view through the top panel of the device adjacent the control knob and cam showing the details thereof.

Figure 4:
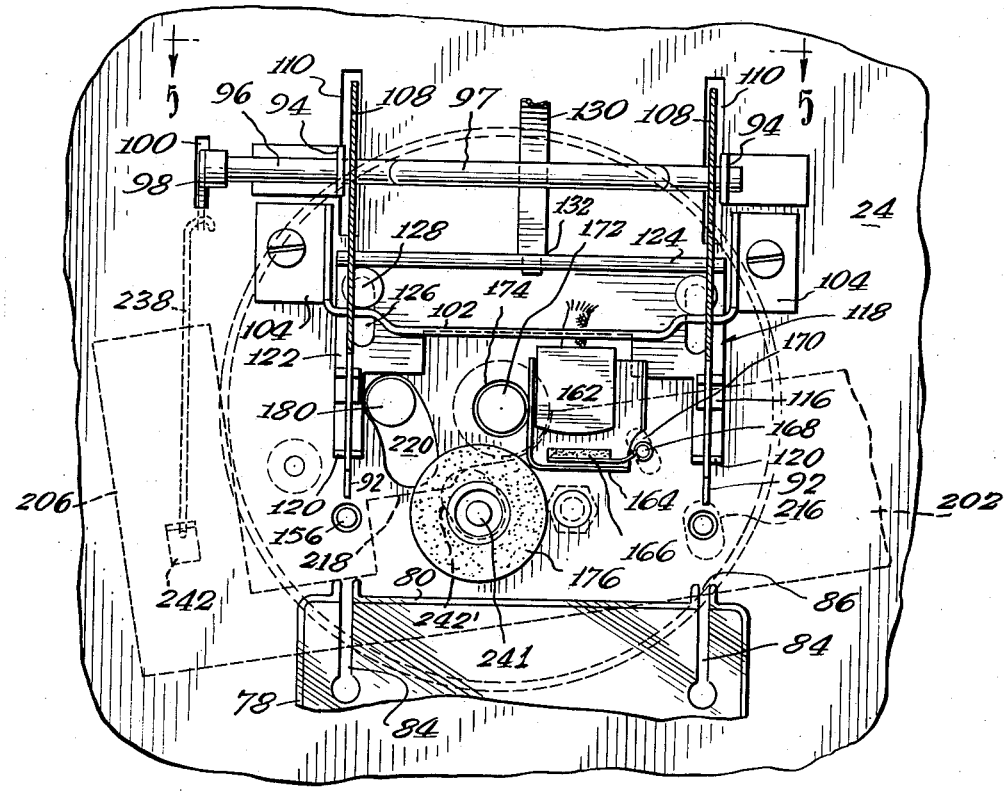
Fig. 4 is a view similar to that of Fig. 3 but with the knob having been moved to ejecting position and the cartridge spaced from operative position.
Figure 5:
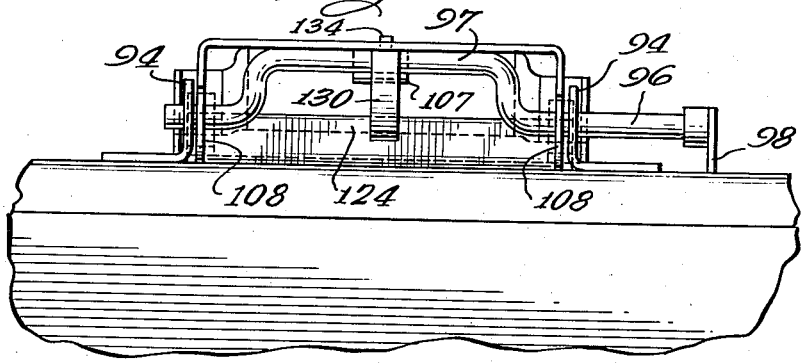
Fig. 5 is a fragmentary rear elevational view of the cartridge holding and ejecting mechanism taken generally along the line 5—5 of Fig. 4 and looking forwardly from the rear thereof.

The invention resides generally in a tape transporting device in which the tape is contained within a cartridge adapted to be associated with the mechanism and the apparatus causes the tape to pass in proper relationship to an electromagnetic head such that the variations in the magnetic properties of the particles dispersed in the tape along the length thereof will produce a current in the winding of the head which varies as the intelligence recorded on the tape. This signal is adapted to be impressed upon an amplifier if desired, or other apparatus for reproduction of the intelligence recorded, either as audible sound or other manifestations. This invention is concerned only with the apparatus which transports the tape. Obviously the head may record, erase and/or play back. Although the description which follows and the illustrations do not refer to or show either means for amplifying the signal produced in the head, or for providing an electrical field for erasure or recording, the invention contemplates that appropriate electrical means for accomplishing these functions may be associated with the device. Such means could be located in the same housing or in other places electrically connected. The invention is not limited to excluding amplifying and recording circuits, as well as speakers, etc., from association with the apparatus, although the novelty lies principally in the structure for utilizing the cartridge and transporting the tape thereof.

The invention is concerned with the mechanism which enables the cartridge to be inserted into operative position and then moves the tape past the head either at a slow play or record speed, a fast play or record speed, or a fast wind speed by means of movement of a single knob. The same knob can also be moved to a position where the cartridge is automatically ejected without any other control member being operated and without the operator being required to do anything manually other than turn the knob.

Through the novel structure, once the cartridge has been manually inserted into the proper position, and automatically locked in that position with the tape disposed opposite the head, every other function is performed through the medium of only the single knob.

Referring now to the drawings, in Fig. 1 there is illustrated a tape transporting apparatus or device which is designated generally by the reference character 20, the same being mounted in a housing 22 of wood or other material having the principal parts secured to a metal chassis, which in this form comprises a metal panel 24 of rectangular configuration. As seen from Fig. 1 there is a guard or shroud 26 secured to the panel 24 on the top thereof and providing a throat or passageway 28 into which the cartridge 30 is to be inserted. Guide protuberances 31 are provided on opposite sides of the throat to simplify the insertion of the cartridge 30 and these are integral with the shroud which covers the positioning, locking and releasing mechanism to be described.

Only one control member is provided on the metal panel 24 and said member consists of a knob 32 which rotates over a multiple position dial or escutcheon plate 34 having several positions thereon. These positions are "Off" which is located at the top of the dial 34 and upon which the knob 32 is disposed in the view; "3¾" which signifies that the tape is being transported past the head at three and three quarters inches per second; "7½" which signifies that the tape is being transported at a speed of seven and one half feet per second; "Fast" which signifies that the tape is being transported at a high rate of speed and is not being used to reproduce or record sound; and "Eject" which is the position to which the knob 32 is moved when it is desired to eject the cartridge. The movement of the knob to the first three positions from "Off" is detented so that the position chosen is retained when the knob is moved thereto. The "Eject" position is preferably arranged to spring load the knob and force its return to the next position when released by the operator. In other words, if the knob is turned to "Eject" position and released, it will automatically move back to "Off" position.

Prior to continuing with a discussion of the structure in detail, it would be advisable to describe the cartridge 30 and for that purpose attention is especially invited to Figs. 2, 3, 4, 6 and 9. The particular cartridge illustrated can of course be varied in construction, but the cartridge per se forms no part of this invention, except insofar as certain cooperation is required between elements of the cartridge and the mechanism. The cartridge 30 consists of a base 36 of plastic material such as any of the well-known thermoplastic resins, having a cover member 38 matingly engaged therewith and cooperating to provide for the necessary functions of the cartridge. The base 36 is rounded at one end 40 and carries a vertical journal 42 thereon upon which is mounted a reel 44 for free rotation, carrying a coil 46 of the well-known magnetic tape which is adapted to be pulled out of the center of the coil 46 as shown at 48, passed toward the opposite and squared end 50 of the base 36 around a pair of hollow corner posts 52 and back to the outside of the coil as shown at 54.

Since the tape is pulled from the center, the reel 44 rotates at a speed greater than required to lay the tape back on the outside of the coil. Thus the tape is always under tension across the front of the base, which stretch or section of tape is designated 56. The squared end 50 of the base 36 may be considered the front end, and it will be seen that there is a rectangular recess 58 therein which is walled on the three inner sides as shown at 60 and has a bar 62 connected across the top between the posts 52. Each of the posts 52 is provided with a central vertical reciprocable piston 64 spring-pressed upward by the helical springs 66 and there being front and rear vertical slots 70 and 72 in each post out of the front of which there extends an upwardly hooked foot 68 integral with the pistons. The tape section 56 passes the front end 50 of the base edge-on upon these feet 68. The base 36 is provided with a pair of positioning holes 74.

The cover member 38 is a molded member, as is the base 36, and matingly engages the same. Suitable seating grooves or pins may be provided to effectuate this engagement, and separation is prevented by means of a fastening screw 76 entering the end of the journal 42. The cover member 38 is of the same configuration as the base, but has side walls all around the same as shown at 78 except that at its front it has a depending narrow integral wall 80 which, when the cartridge 30 is assembled, is spaced a short distance from the bar 62 to form a downwardly opening channel formation, with the section of tape 56 passing between the bar 62 and the short wall 80 and normally protected by said channel formation. Since there is no equivalent of the recess 58, which is covered, the resulting chamber inside the cartridge 30 is U-shaped with the tape threaded out the ends of the U from arm to arm. Depending integral parts 82 restrain axial displacement of the coil of tape 46.

The cover member 38 has slots 84 on opposite sides thereof which are formed in the top and which connect with vertical slots 86 at the front of the cover. The side walls 78 extend around the front corners of the cover member and form a short vertical reenforcing wall 88 on each side of the opening 90 bridged by the short wall 80. The vertical slots 86 are formed on these reenforcing walls 88.

When the cartridge 30 is in operative position, a pair of narrow blades 92 enter the slots 84 and pass down through the cartridge in slots 86 pressing down on the pistons 64 against the pressure of the springs 66 and lowering the tape section 56 from its protective position in the channel formation to a position at the opening 90 where, as will be seen, it is aligned with the magnetic head, pressure pad, and driving means.

As previously explained the only functions of the device which are not performed by movement of the knob 32 are the insertion of the cartridge 30 and its locking in place, which are done manually. The structure which enables the manual movement of the cartridge 30 into the throat 28 to position and lock the cartridge in place will now be explained, and for this purpose attention is especially invited to Figs. 2, 3, 4, 5, 9 and 10.

The upper face of the panel 24 is provided with a pair of upstanding ears 94 and a shaft 96 is journalled in suitable perforations in said ears, the shaft 96 having a central offset crank portion 97 between the ears and being connected at one end with a lever 98 capable of rocking the shaft. The lever 98 extends through a slot 100 in the panel 24 and is adapted to be swung to rotate the shaft 96 when it is desired to eject the cartridge 30, as will be explained. The shaft 96 is mounted toward the rear of the panel, and just forward thereof is a vertically arranged, transversely extending bar 102 which is affixed to the panel as at 104. A shallow channel-shaped rocker member 106 is removably mounted on the shaft 96, the crank portion 97 being wedged against a tongue 107 formed in the rocker member 106. The rear of the rocker member has an elongate cam part 108 on opposite channel sides 112 which pass through slots 110 provided therefor in the panel. The cam parts 108 are integral with the channel sides of the rocker member 106 and there are recesses 111 to facilitate mounting the rocker on the shaft 96.

The web or center of the rocker member 106 does not extend forward as far as the channel sides 112 which terminate in the forwardly extending blades 92, which have previously been mentioned. There is a depending extension 114 on each side 112 just forward of the bar 102 which each engage the rear vertical parts 116 of U-shaped pushers 118 positioned when moved as shown in broken lines in Fig. 10. The vertical parts 120 of the U-shaped pushers are not as high as and are spaced forward of the parts 116. The pushers 118 are mounted on flat strips 122 which lie upon the panel 24 and extend rearwardly beneath the bar 102 and are connected across their back ends by a member 124. The strips 122 are slotted as at 126 and the slots are engaged by pins 128 which permit both pushers 118 to slide front and rear. There is a leaf spring 130 which is engaged between the center of the cross member 124 at 132 and the center of the rocker member 106 at its rear at 134. The leaf spring urges the pushers 118 forward, i.e., to the right as viewed in Figs. 9 and 10, and this is especially true when the rocker member 106 is moved from the position shown in Fig. 9 to that of Fig. 10 since in addition to the pressure of spring 130 the entire spring is bodily moved forward by the rocker member 106.

The rocker member 106 is urged to rotate to a position parallel with the panel 24, i.e., in a clockwise direction as viewed in Fig. 10 about the shaft 96. This bias is provided by the pressure of a metal plate 138 pivotally mounted on pins 140 on the bottom of the panel 24 directed upward against the lower cam edges 142 of the cam parts 108 extending through the slots 110. The plate 138 is pressed upward by a large flat spring 144 secured to the panel 24 by clamp 145 held by screw 146, the panel having a flanged rear edge 148.

The knob being set at "Off" and the rocker arm 106 and its parts being in the normal poised position of the broken lines of Fig. 10, the pushers 118 are forward of their maximum extent as controlled by the slots 126 engaging pins 128. To put the cartridge 30 in proper position for operation of the device, the operator slides the cartridge 30 upon the surface of the panel 24 into the throat 28. The lower parts of the reenforcing walls 88 protrude forward of the cartridge as shown at 150 in Fig. 9 and will engage the vertical parts 120 of the pushers 118. The blades 92 enter the slots 84 and 86 of the cartridge 30. The operator continues to push the cartridge home, and as this is done, the vertical parts 116 slide along the bottom ends 152 of the extensions 114 and this movement is continued until the extensions 114 are cleared.

During this movement the pressure against the pushers 118 was being transmitted to overcome the tension of the leaf spring 130. Rearward movement of the vertical parts 116 is limited by the bar 102. When the extensions 114 have been cleared, the vertical parts 116 of the pushers 118 are immediately adjacent the bar 102, and the entire rocker member 106 snaps downward to the position shown in Fig. 9. The blades 92 engage the tops of the pistons 64 and move the same downward, carrying the tape section 56 into the position shown in Fig. 9, below the protecting cross bar 62 and wall 80. Simultaneously, pins 156 located on the ends of extensions 158 of the plate 138 move upward through holes 160 in the panel 24 into the positioning sockets 74, and accurately position the section 56 of tape.

Referring to Figs. 2, 3 and 4 it will be seen that there is an electromagnetic head 162 mounted on the bar 102 and extending forward between the pushers 118. It is suitably shielded at 164 and there is a pressure pad 166 spaced forward of the head 162 and so positioned that when the cartridge 30 is installed as described, the dropping of the rocker member 106 and the movement of the blades 92 will bring the tape section 56 between the pressure pad 166 and the head 162. The pressure pad is mounted on a post 168 which extends through a slot 170 in the panel 24 and is adapted to be moved to position pressing the tape section 56 against the head in a manner to be described. Alongside the head there is provided a drive capstan 172 journalled at 174 in the panel and adapted to cooperate with a rubber pressure roller 176 mounted for idling rotation forward of the capstan 172. The dropping of the tape section 56 will carry the tape between pressure roller 176 and drive capstan 172. The roller 176 is mounted on a movable member as will be described so that it can be engaged against the capstan 172 with the tape between to drive the tape. A fast speed capstan 180 is also mounted opposite the pressure roller 176 but is normally not capable of cooperating with the pressure roller 176 for driving the tape.

It will be noted that a considerable portion of the shielding 164 and practically all of the pressure roller 176 are disposed in the space 58 of the cartridge, having entered through the opening 90 during installation of the cartridge.

Looking at Fig. 10, which illustrates what occurs when the knob 32 is moved to "Eject" position, one sees that the rocker member 106 has been raised against the bias of the spring 144 to clear the vertical portions 116 of the pushers 118. This is done by a mechanical linkage between the knob 32 and the lever 98. Rotating the lever 98, that is, swinging it in a counter clockwise direction about the shaft 96 as viewed in Fig. 6, raises the extensions 114, permitting the leaf spring 130 to suddenly snap the pushers forward. The raising of the rocker member 106 also raises the blades 92, returning the tape section 56 to its protected position, lowers the plate 138 and hence withdraws the pins 156 from the holes 160 and the positioning sockets 74. The rotation of the rocker member 106 about its shaft 96 in a counter-clockwise direction as viewed in Figs. 9 and 10 moves the cam ends 142 through the slots 110 into engagement with the top of the plate 138 and causes the lowering, above referred to, against the pressure of the spring 144.

The sudden forward movement of the pushers 118 (to the right as viewed in Fig. 10) will project the entire cartridge 30 out of the throat 38 so that it is completely free. The velocity of this projection depends of course upon the strength and resilience of the spring 130, and may be adjusted so that the cartridge slides only a short distance. In order to assure that the mechanism is completely cleared however, the spring 130 is made fairly strong, and a pair of rubber bumpers 182 are secured to the top edge of the housing 22 to stop the forward sliding movement of the cartridge. Confining means may be used, as for example where the device may be used in other than a horizontal disposition, and suitable stop means may be associated therewith.

The control of the operation of the apparatus will now be described in connection with Figs. 4, 6, 7, 8, 11, 12, 13 and 14.

As will be understood from the description thus far, the only control member for the apparatus for accomplishing all of the functions required in recording, or playing back at two different speeds, in stopping the mechanism, winding the tape at a fast rate and ejecting the cartridge 30, is the knob 32.

The knob 32 is mounted on a shaft 184 (Fig. 14)

journalled in the metal panel 24 and having a detent member 186 and an irregular shaped cam member 188 fixed to the shaft 184 below the panel in proper relationship to the knob 32 and the markings on the escutcheon plate or dial 34. There are five positions of the knob 32, and desirably the rotational position of the shaft 184 is detented in each position. The detent member 186 may take the form of a simple hexagonal wafer or even a nut, welded or in other manner affixed to the shaft and cooperating with a resilient rod 190 which has an end embedded in a block 192 which in turn is secured to the bottom face of the panel 24 at a suitable location. The rod 190 is sprung to be biased toward the detent member 186.

In order to render the explanation lucid, and clear, the condition of the linkages and the elements of the apparatus relating to operation and control will be explained for each position of the knob 32. But for the "Off" position, there will also be explained the cooperative movement of the linkages between positions.

"Off" position

Figure 7:
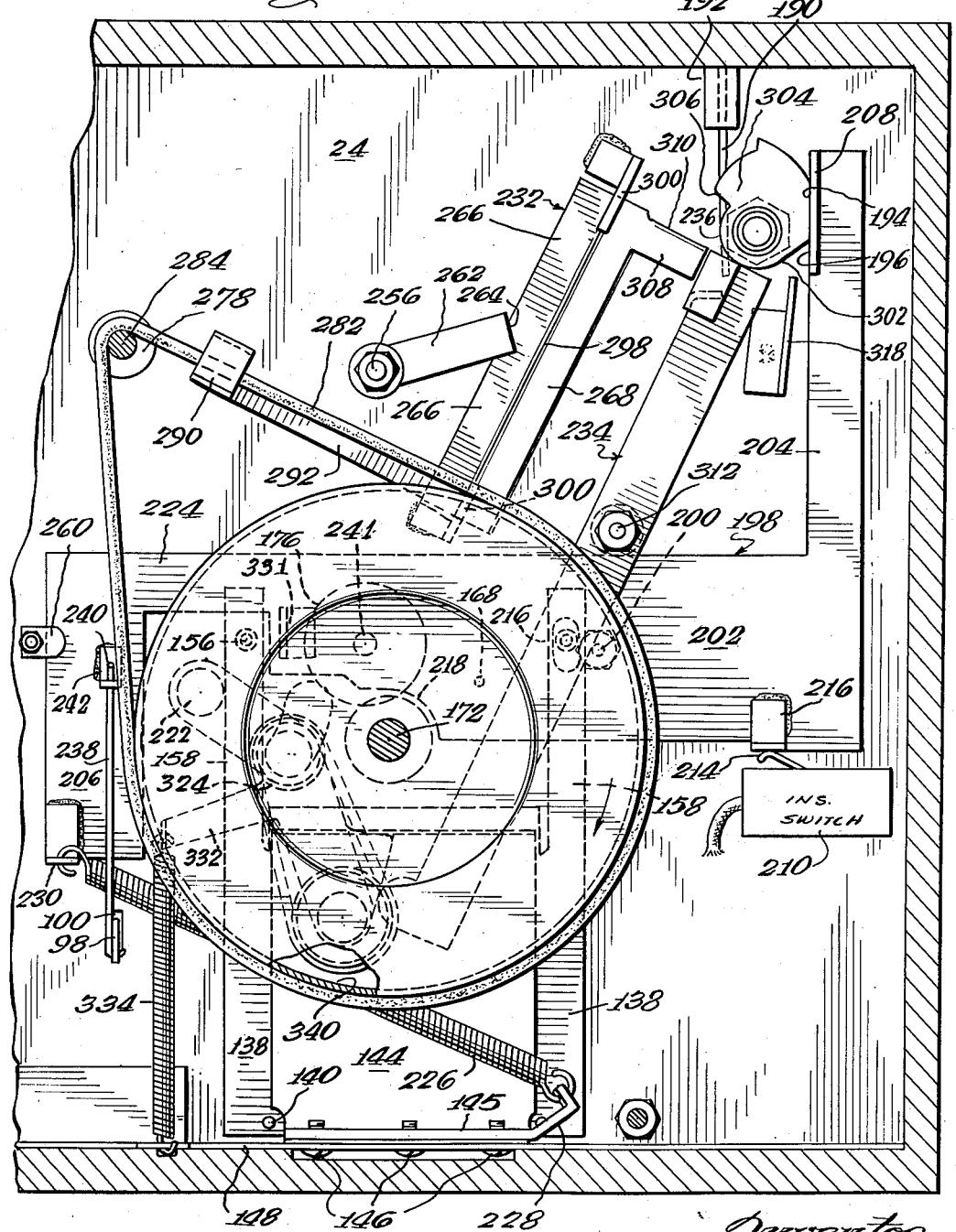
Fig. 7 is a bottom plan view of the apparatus with the cartridge in place and the control knob in "off" position.

The cam member 188 is in "Off" position in Fig. 7. This is represented by a flat cam edge 194 which is shown engaging a bearing surface 196 on a large generally Z-shaped lever 198. The lever 198 is formed of flat sheet metal and is in contact with the bottom face of the panel 24, being mounted for pivotal rotation about a pivot pin 200. In Fig. 7 there is a horizontally arranged relatively wide portion 202 which will be termed the center, and a pair of oppositely, laterally extending arms 204 and 206 at the ends which will be termed respectively the cam arm and the operating arm. The bearing surface 196 is provided by an upstanding lug 208 formed on the end of the cam arm 204.

A switch 210 for energizing the electric motor 218 (Fig. 6) is mounted to the bottom of the panel 24 as shown in Fig. 7 with a button or toggle arm 214 engaging a bracket 216 secured to the center portion 202 of the lever 198. The lever 198 is adapted to move from its position as shown in Fig. 7 in a counter-clockwise direction about its pivot pin 200, and in this movement, it will be seen that the toggle arm 214 will be released. The switch 210 is constructed and arranged, in any conventional manner, so that the electric motor 212 is not energized while the toggle arm 214 is in the condition illustrated in Fig. 7. Depressing the toggle arm further will, of course, have no effect since release is required to close the electrical circuit of the switch.

During the time that the cartridge 30 is in operative position, the pins 156 are located in the holes 160 and project upward through the panel 24 for the purposes previously described. As seen in Figs. 9 and 10 these pins pass through the center part 202 of the lever 198, and so that there should be no interference, a suitable slot or recess 216 is provided to clear the pins. Likewise a large recess 218 of irregular shape is provided to clear the journal 174 of the drive capstan 172, the slot 220 in which the fast speed capstan 180 moves, the depending pivot post 222 of the fast speed linkage (to be described) and the other pin 156. As a matter of fact, the irregular shaped recess 218 narrows considerably as at 224 where the central part 202 joins the operating arm 206. This is best shown in Fig. 8.

A rather strong helical spring 226 is stretched from a lug 228 secured to the rear flange 148. Lug 228 may be a part of the clamp bar 145. The opposite end of the spring 226 connects with a bracket 230 welded or otherwise secured to the end of the operating arm 206. Obviously the spring 226 tends to pull the arm 206 to cause the Z-shaped lever 198 to rotate in a counter-clockwise direction about the pivot 200 and therefore, pressure is brought to bear by the bearing surface 196 against the flat 194 of the cam 188. This aids the detent member 186 and associated rod 190 in holding the shaft 184 and knob 32 in "Off" position.

Since the motor 212 is not energized, none of the drive capstans are rotating, in "Off" position. The levers and links of importance relative to the operation of the apparatus at various speeds are not affected under these conditions. The speed change lever 232 and the fast wind lever 234 are not engaged by the cam 188, since the smallest radius portion 236 is disposed toward the ends of these levers. The detailed description thereof will be left for another section.

The lever 98 which, it will be recalled, was to rotate the shaft 96, is connected to a link 238 which has a hooked end 240 engaged in a perforated bracket 242 secured to the bottom of the operating arm 206, as shown in Figs. 7 and 8. Thus, the connection between the link 238 and the arm 206 is a lost motion connection. There will be two positions of the lever 98 and link 238 as illustrated by the solid and broken lines of Fig. 8, corresponding to the condition of the rocker member 106 with and without a cartridge in place, respectively.

The apparatus is in one condition with the rocker member 106 as shown in Fig. 10 awaiting the insertion of a cartridge 30, and in the second condition in Fig. 9 when the cartridge has been inserted. In either condition, the knob 32 is still in the same "Off" position.

Two functions are dependent upon rocking or rotating movement of the Z-shaped lever 198. The one is the moving of pressure roller 176 into engagement with the drive capstan 172 with the tape between for driving the tape, and the other is the moving of the pressure pad 166 against the poles of the head 162. This is done simultaneously as will be explained, but of course when the knob 32 is at "Off" position, there must be space for the tape section 56 to pass into position between the roller 176 and capstan 172 and between the pressure pad and poles.

The post 168 extends through the slot 170 in the panel 24 as previously explained and is secured to the central section 202 of the Z-shaped lever 198. The pressure roller 176 is mounted for idling rotation on a shaft 241 which passes through a suitable slot 242' in the panel 24 to enable the shaft to be translated, and the said shaft is secured to the central portion 202 of the Z-shaped lever 198. This is shown in Fig. 4.

"3¾" position

Since this position is one in which the tape of the cartridge is transported past the head for record or playback, parts of the apparatus which were inoperative during the "Off" position of the knob 32 will herein be described.

Figure 6:
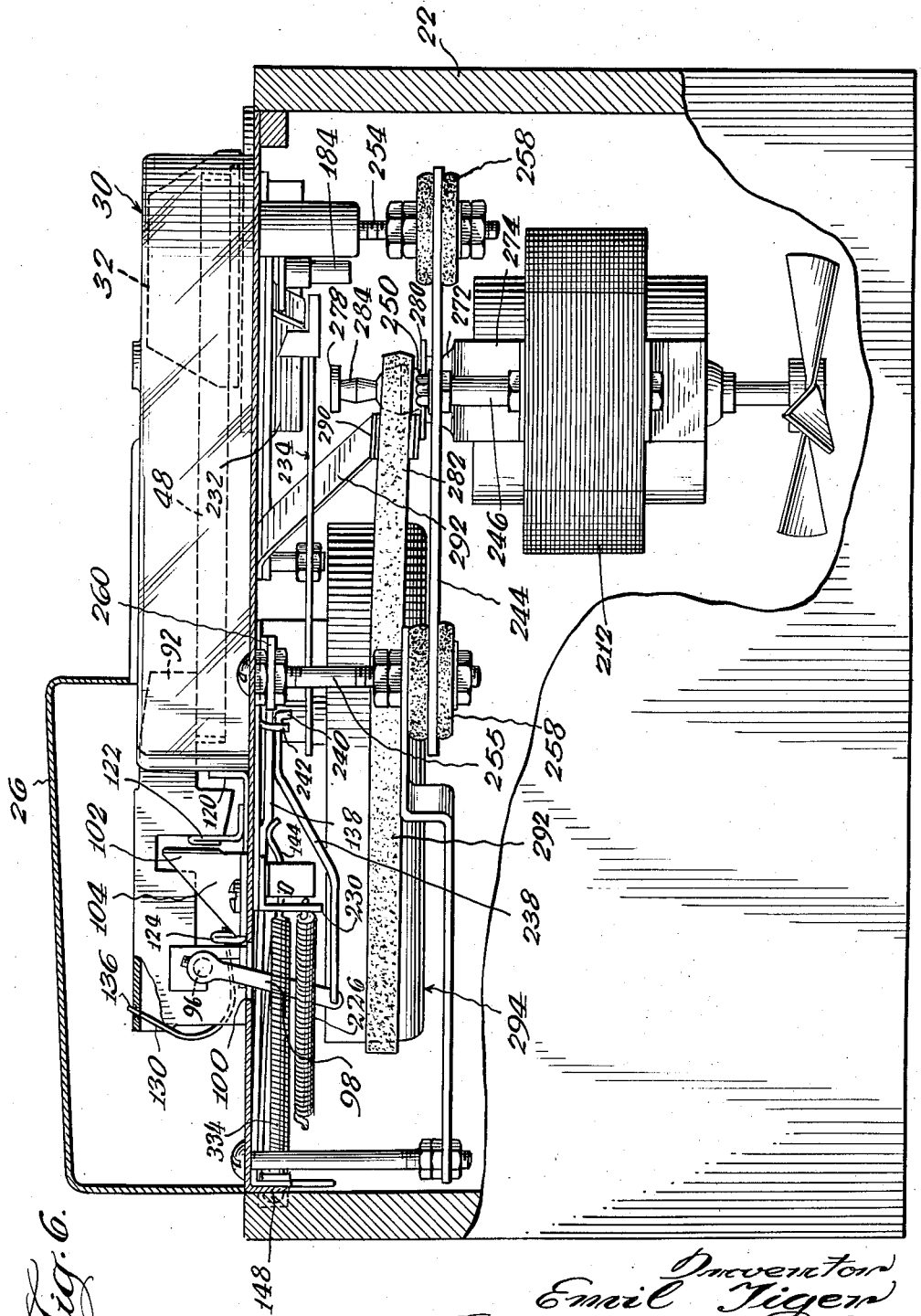
Fig. 6 is a sectional view taken through the device with parts shown in elevation viewed from the left side of Fig. 1.

There is provided an electric motor 212 previously referred to which is mounted upon a platform or sub-chassis 244 by means of at least a pair of support posts 246 which comprise tubular spacers secured to the sub-chassis 244 by bolts 248 which extend through the spacers 246 and are held in place by washers and nuts as at 250. A fragment of this support means is shown in Fig. 13, and one complete spacer is shown in Fig. 6, the other being on the opposite side of the motor 212 and not visible in this view. This explanation is merely to describe one way of supporting the motor 212, and is detailed to prevent any misunderstanding of the illustrations, since the motor shaft 252 is not visible in Fig. 6 and only a very small section is seen in Fig. 13, wherein the support spacer 246 and its bolt 248 are broken away. Many other methods of supporting the motor 212 are well within the purview of the invention, it being desirable at times to arrange the mechanism so that the motor 212 is supported on the top of the platform 244 to decrease the dimensional height of the housing for supporting the tape transporting apparatus 20.

The platform or sub-chassis 244 is itself mounted to the bottom of the panel 24 by any suitable spacing means such as, for example, the posts 254, 255 and 256 which may be bolts held in place by any conventional manner such as washers, spacers, nuts, etc. The connection between the platform 244 and the support posts is accomplished preferably through the medium of shock-proof rubber mountings 258, the position of which may be adjusted by positioning the nuts along the lengths of the posts.

Other functions may be performed by the posts, such as for example the post 255 has a guide member 260 (Figs. 6, 7, 8) which confines the movement of the Z-shaped lever 198 to take place parallel to the surface of the panel 24; and the post 256 has a leaf spring 262 secured thereto which has its end 264 pressing against the elongate half 266 of the speed change lever 232 to resist the rocking of the member onto the other elongate half 268.

The motor shaft 252 extends through an opening 270 in the platform 244, being disposed to protrude from a boss 272 formed on the motor frame 274 which also extends into the opening 270. To the shaft 252 there is secured a drive sheave or pulley designated generally 276. The pulley has an upper disc end 278 and a lower disc end 280, the combined purpose of which is to prevent the belt 282 from slipping off either end of the pulley 276. The pulley 276 has an upper drive portion 284 and a larger diameter lower portion 286, both drive portions being crowned for efficiency in power transmission while making it easier to shift the belt by slight up or down movement thereof. A tapered section 288 connects the drive portions. The two positions of the belt 282 represent fast and slow speeds of the tape and both are shown in Fig. 13—the fast speed position of the belt being shown in solid lines and the slow speed position being shown in broken lines.

Since this section relates to the position of the knob 32 when it is set on "3¾" it will be understood that when the knob is in position, the belt will be arranged as shown in the broken lines of Fig. 13. The belt 282 is guided between a channel-like guide member 290 which is secured on the end of an arm 292 that forms a lateral extension of the elongate half 266 of the speed change lever 266. The belt 282 extends around a large flywheel 294 of shallow cup-shaped form, having the main drive capstan 172 permanently secured thereto as the shaft thereof, and having a large annular peripheral flange 296 on the outer circumferential surface of which the belt is engaged so that rotation of the shaft 252 will rotate the flywheel 294 and rotate the capstan 172.

As shown in Fig. 7 the speed change lever 232 is an integral elongate member which may be formed simply by slightly folding a strip of metal along its length to a shallow V to form the halves 266 and 268. The member is rockable on its crease or fold 298 and for this purpose is held in place by short pivot members 300 aligned with one another and overlying the fold 298 at opposite ends of the member 232 and secured to the bottom surface of the panel 24. The normal position of the lever 232 is with the half 266 pressed flat against the surface of the panel 24, the half 268 slightly raised off the bottom surface of the panel 24, and the arm 292 arranged with the belt engaging the smaller diameter pulley portion 284. This condition is in nowise changed when the knob 32 is rotated to the "3¾" position from the "Off" position.

The dimensions of the parts described, and their relations with one another are such as to drive the tape section 56 past the head 162 at a speed of three and three quarters inches per second providing the motor is rotating and the pressure roller 176 has pressed the tape against the drive capstan, and the pad 166 has pressed the tape against the head.

When the knob 32 is rotated sixty degrees clockwise as in Fig. 1, the cam member 188 rotates from the position shown in Fig. 7 in a counterclockwise direction (since this latter view is from the bottom of the panel 24). The cam 188 has a flat portion 302 which now moves to a position parallel with the lug 208 of the cam arm and engaging the bearing surface 196 thereof. From an examination of Figs. 11 and 12 it will be evident that the radial distance of the flat 194 from the axis of the shaft 184 is substantially greater than the radial distance of the flat 302 of the cam 188 from the axis. Because of this, the flange 208 will follow the position of the flat 302 and move from the position shown in Fig. 7 to that shown in Fig. 11. The radial distance of the flat 302 from the axis of the shaft 184 is substantially the same as the radial distance of the arcuate portion 236 therefrom.

During this movement, it will be seen that the arcuate portion 236 is disposed opposite the ends of the levers 232 and 234 so that neither of these two levers is in any way affected by the movement of the knob from "Off" to "3¾" position.

As for the Z-shaped lever 198, since the new position of the cam 188 has caused a slight rotation of the said lever about its pivot 200 in a counter-clockwise direction, three functions have been performed: (1) the bracket 216 has moved away from the toggle arm 214 of the switch 210 and closed the circuit to energize the motor 212, thereby causing the rotation of the motor shaft 252 and consequent rotation of the drive capstan 172 at a slow speed of three and three quarters inches per second; (2) the shaft 241 of the pressure roller 176 is moved upward as viewed in Fig. 3, for example, to the position indicated by the broken lines, thereby seizing the tape section 56 between the pressure roller 176 and the drive capstan 172 and driving the same to the left as viewed in Fig. 3; (3) the post 168 is moved upward and the pressure pad 164 presses the tape section 56 to the poles of the head 162.

*"7½" position*

When it is desired to move the tape past the head at the faster speed of seven and a half feet per second, the knob 32 must be moved approximately another sixty degrees clockwise as viewed in Fig. 1. This movement will rotate the cam 188 to the position illustrated in Fig. 11. As will be realized from the description of the engagement of the cam with the bearing surface 196 for the "3¾" position, there will be no effect upon the Z-shaped lever 198, and hence the three functions accomplished in moving from "Off" to "3¾" position are unaffected. The drive capstan 172 remains in contact with the pressure roller 176 and the tape is between, and the pressure pad 166 continues to hold the tape against the poles of the head 162. The motor 212 remains energized and its shaft continues to rotate.

It will be seen that the cam 188 has a large tooth 304 formed integral therewith and that considering the counter-clockwise direction as viewed in Figs. 11 and 12, the leading edge 306 of the tooth 304 is a radially extending camming face. The elongate half 268 of the rocking change speed lever 232 has a short lateral extension 308 opposite the arm 292 which has a rounded flanged edge 310 which is normally slanted downward at an angle, as viewed best in Fig. 14, directly in the rotative path of the tooth 304. The extension 308 is coplanar with the half 268 so that the plane of the extension intersects the plane of the cam 188 at an acute angle. The view in Fig. 14 also illustrates the angular relation of the halves 266 and 268 one to the other.

When the cam is rotated, the leading edge 306 of tooth 304 engages the rounded edge 310 of the extension 308 and rocks the speed change lever 232 about the pivots 300, raising the elongate half 266, and lowering the elongate half 268. This will lower the arm 292 with its channel-shaped guide member 290 from the broken line position of Fig. 13 to the solid line position. Fig. 6 also illustrates the fast speed position of the channel-shaped guide member 290.

Since the belt is being continuously driven while this is taking place, the belt is urged to slip from the upper speed portion 284 of the pulley 276 onto the lower fast speed portion 286, and the speed of the drive capstan 172 increases accordingly. The belt 282 is made from some flexible, resilient material such as rubber, either natural, synthetic or combinations thereof, to enable sufficient stretch and contraction to occur during the speed changes without slippage developing.

The usual shift of speed of a tape recording device is accompanied by a change in electrical characteristics of the system, such as frequency response and gain. Network elements are often inserted or removed simultaneously with this change, in order to permit compensation and the movement of the lever 232 can be used to switch network elements into and out of a circuit. Since the invention is concerned primarily with the mechanical structure, no illustration of this added structural element is believed necessary, since it should be obvious to those skilled in the art from the description herein.

"Fast" position

In the use of any tape transporting mechanism, there is a need for fast movement of the tape, either in winding or re-winding tape upon reels, or in this instance, in moving the tape forward to a new position. For example, if there are several selections on the tape coil 46, it may be desired to position the tape at some selection requiring considerable movement of the tape. In this situation, the tape is required to be moved at a high rate of speed, and desirably, the tape should also be moved away from the head so that there will be no noise accompanying this transportation.

To obtain the increase of speed under the conditions described above, the knob 32 is rotated from "7½" position in a clockwise direction (Fig. 1) approximately sixty degrees to "Fast" position, thus rotating the cam 188 counter-clockwise from the position shown in Fig. 11. The arcuate cam edge 236 still rides the bearing surface 196 at the beginning of the movement, but as the rotation is completed, the cam arm 204 will move a slight distance away from the edge 236 for reasons which will be explained.

The fast wind lever 234 is an elongate member, pivoted at 312 for rotation in a plane spaced below the lower surface of the panel 24. In Fig. 7 it will be seen that this motion can only be clockwise because of the stopping effect of the pivot 200. The end of the lever 234 adjacent the cam 188 has a vertical camming flange 314 integral therewith arranged in the path of the tooth 304. The tooth 304, it will be noted, has its arcuate portion 316 constructed in such configuration that the radial dimension from the axis of the shaft 184 increases from the edge 306 toward the tooth 318. As the cam is rotated from the "7½" to the "Fast" position, the edge 316 of the tooth 304 engages the flange 314 and swings the lever 234 down as viewed in Figs. 11 and 12. There is a stop member 318 secured to the panel 24 and the engagement of the edge 306 therewith limits swinging movement of the lever 234.

The detent action of the rod 190 on one of the flats of the detent member 186 will hold the position attained and as well the various positions of the cam 188 will be maintained by other flats of the member 186.

Attention is now invited to Figs. 7 and 8 to explain the structure which couples the rotation of the flywheel 294 with the fast wind capstan 180. Mention has been previously made of a pivot post 222 depending from the underside of the panel 24. To this post there is swingably mounted a link 320 to the end of which there is pivotally mounted another link 322. The pivot itself comprises the bottom end of fast wind capstan 180 which extends upward through the panel 24 by way of an arcuate slotted opening 220 which permits swinging movement of the capstan about the pivot 222.

To the bottom end of the capstan 180 there is secured a pulley 324 and on the end of the link 322 there is rotatably disposed an idle pulley 326 which has a shallow peripheral groove 328 so that a rubber belt 330 looped between the pulleys 324 and 326 is exposed around the periphery of the pulley 326. The link 322 has a lateral arm 332 which has a spring 334 connected between its end and the flanged rear edge 148 which tends to pull the capstan 180 to the bottom of the slot 220 (Fig. 8) away from the pressure roller 176. On the edge of the link 322 opposite the extension 322 there is provided a bearing surface 336 and the follower end 338 of the lever 234 engages said bearing surface. The bearing surface is arranged angularly relative the link 322.

In Fig. 8 the relative arrangement of parts prior to the knob 32 being moved to "Fast" position as shown. Note that the link 320 and 322 and the pulleys 324 and 326 are disposed within the circumferential projection of the flywheel 294. The plane of the belt 330 is spaced from the panel 24 to bring the same between the top and bottom edges of the flywheel, and hence the pulley 326 is juxtaposed relative the inner peripheral surface 340 of the flywheel flange 296.

When the fast wind lever 234 is rotated by the cam 188 in a clockwise direction about the pivot 312 (Fig. 8) the first action is that the link 322 is swung clockwise about the capstan pivot until the exposed belt 330 contacts the inner surface 340 of the flywheel flange 296. This starts the capstan 180 rotating. As the lever 234 continues to swing, the follower end 338 riding up on the surface 336, the link 322 is pushed upward as viewed in Fig. 8, and swings the link 320 about the pivot 222 against the bias of the spring 334, carrying the capstan 180 against the pressure roller 176 with the tape 56 between. In the meantime, the capstan 180 is still maintained rotating by the spring 334 continuing to press the pulley 326 against the flywheel flange to cause frictional engagement between the belt 330 and the flywheel.

Prior to engagement between the fast wind capstan 180 and the pressure roller 176, the edge of the link 320 engages a bracket 331 mounted on the center 202 of the Z-shaped lever 198 and relieves the pressure of the roller 176 against the drive capstan 172 while moving the pad 166 from the head 162 to permit the tape to be freely transported when seized between capstan 180 and pressure roller 176 at the end of the full movement of the lever 234. When fast wind is occurring the flange 208 has been moved slightly away from cam 188.

If desired, instead of using the link 320 and bracket 331 to relieve the pressure between the drive capstan 172 and roller 176, and between the pressure pad 166 and head 162, other means may be used. In one structure not here illustrated, the cam 188 was mechanically connected to push the Z-shaped lever 198 in a clockwise direction about its pivot 200 (viewed from the bottom) just prior to causing engagement between the fast wind capstan 180 and the pressure roller 176. The "Fast" position of knob 32 in this case may be chosen more than sixty degrees from its previous "7½" position to enable sufficient movement of cam 188 to accomplish the added function.

In moving the lever from "Fast" position back through the two intermediate speed positions, the movements of the various elements of the apparatus are believed obvious from the above discussion, and hence the next section will be discussed with the presumption that the starting position of the knob 32 is "Off."

"Eject" position

The "Eject" position is attained by rotating the knob 32 in a counter-clockwise direction in Fig. 1 which rotates the cam 188 in a clockwise direction as viewed in Fig. 12. This movement causes the bearing surface 196 to ride upon the edge of the tooth 318, which, it will be seen, increases its radial distance from the axis of the shaft 184 as the movement is caused. This pushes the lever 204 downward as seen in Fig. 12 and swings the Z-shaped lever 198 in a clockwise direction about its pivot 200 causing further depression of the toggle 214 and hence not energizing the motor 212; separating the pressure pad and the pressure roller 176 even further from the head 162 and drive capstan 172 respectively, and hence having no effect upon the tape. The movement does, however, move the bracket 242 upward (Fig. 7) relative to the link 238 and hence catches the hooked end 240 of the link and pulls the same causing rocking of the lever 100 and ejection of the cartridge 30, as previously described. No other function is performed during this movement. The rocker 106 is automatically latched in raised position for the reception of another cartridge. The term "jaw" is used at times in the claims for the word "rocker."

Of the positions of the knob 32, this is the only one that is biased to return to the previous one, which in this case is "Off." This is accomplished because the curvature of the camming edge of the tooth 318 and the strength of the spring 226 are chosen to overcome the pressure of the rod 190 on the detent member 186.

Conclusion

In view of the particular adaptation of this apparatus for use with a cartridge in which the tape is required to be rotated in one direction only, it will be noted that there is no need for providing means for reversing the direction of movement of the tape. On the play-record positions, as well as under conditions of fast wind, the tape always moves in the same direction, and the connections of the movement transmission means are so designed.

The apparatus 20 is capable of considerable variation within the contemplated scope of the invention. The drawings illustrate only two leads (one may be grounded) emerging from the head 162 as for example at 342 in Fig. 2, but this is not intended to infer that this is a one purpose device. As previously stated, the head may be a multiple purpose head, having an erase pole as well as a record-playback pole, and suitable electrical circuitry may be provided to enable use of such a head. For example, a control member, such as a multiple pole switch, may be carried on the panel 24 connected with circuitry to enable the conversion of the apparatus into a record or play-back device. The tape transporting mechanism will in no way be changed because of this.

Changes in the sizes and proportions of the parts; in the arrangement and configurations thereof; and as well the utilization of different kinds of mechanical linkages, connections and kinematic chains can be made without departing from the basic invention as defined in the appended claims, in which the broadest scope of equivalents is intended within the bounds of the pertinent prior art.

What it is desired to claim by Letters Patent of the United States is:

1. A tape transporting device for use with a cartridge having a magnetic tape coiled therein, means supporting a section of the tape normally protected at one level but said means being movable to expose said section at a second level; comprising a cartridge receiving surface having mounted thereon a drive capstan, an electromagnetic head, a pressure roller arranged for movement against said drive capstan, a manual control normally at a neutral position, the cartridge adapted to be moved on said surface to an operative position with the section of tape disposed in alignment between the capstan and roller and opposite said head but with said tape at said one level, means actuated by said cartridge as same is moved into said operative position to lock said cartridge in said operative position and move said support means to expose said section of tape at said second level, the positions of capstan, roller and head relative to said surface being such that when the cartridge is in said operative position and the tape at said second level, the pressure roller, capstan and head are at the same level, a motor and transmission means connecting the motor to drive the capstan, said control movable from said neutral to a first position, means actuated by the control during said movement from neutral to said first position to energize said motor and move said capstan and roller together with a part of said tape section engaged therebetween, while another part of said section is against the active pole of said head.

2. A device as described in claim 1 in which spring-pressed ejector means are provided to eject said cartridge from said operative position, said ejector means being rendered inoperative as said cartridge is moved into said operative position, and in which manually movable means are provided to unlock said cartridge and move said support means to return said section of tape to the first level, while permitting operation of said ejector means.

3. In a tape transporting device for use with a cartridge having a coil of magnetic tape, means supporting a section of tape normally protected, but said means being movable to expose said section in operative position and index recesses in said cartridge; cartridge holding and ejecting means, comprising a pair of pivoted jaws, means between the jaws for driving the tape and for magnetically cooperating therewith but only when said tape has been moved to said operative position, the jaws being normally biased to close, spring-pressed means holding the jaws open, the cartridge adapted to be inserted between the jaws to an operative position relative said driving and magnetically cooperating means and thereby to move said spring-pressed means to a non-holding position while being so inserted to permit the jaws to close, one jaw arranged to engage said support means as the jaws are closing and moving said support means to expose said tape section and to position said tape in said operative position, index means simultaneously movable into said index recesses while said jaws are closing, means latching said spring-pressed means to non-holding position, and manual actuating means simultaneously opening said jaws, withdrawing said index means and unlatching said spring-pressed means whereby to eject said cartridge from between said jaws while said spring-pressed means is moving to holding position to poise the jaws for again receiving a cartridge therein.

4. A structure as described in claim 3 in which one of said jaws comprises a platform and the other jaw comprises a rocker member pivoted on an axis parallel to the platform, and in which the cartridge is adapted to be slid along said platform into said jaws, and said rocker member is thereby released to move against said carriage.

5. In a device of the character described, a structure for holding and ejecting a cartridge provided with tape-lowering means, indexing recesses in the bottom thereof, and openings in the top communicating with said tape-lowering means; comprising a panel along which said cartridge is adapted to be slid to an operative disposition, a rocker member secured at one end thereof to a shaft and said shaft mounted parallel with said panel, said rocker member having cam means extending to the bottom of the panel, a spring-pressed pressure plate pivoted to the bottom of said panel engaging said cam means on the bottom of the panel and tending to cause the rocker to swing its free end against the panel, said plate having index members adapted to pass through the panel and into the recesses when the cartridge is aligned in operative disposition upon swinging movement of said plate, a reciprocable stop member disposed on said panel in the path of said rocker member to prevent said free end from swinging toward said panel, and in the path of said cartridge as same is slid to said operative disposition, whereby when said cartridge is slid to said operative disposition the stop member will be pushed out of the path of said rocker member and the rocker member will move toward the panel, the rocker member having extension means on its free end entering said openings in the top of the cartridge to engage said tape-lowering means, the index members simultaneously entering said indexing recesses.

6. A structure as described in claim 5 in which the stop member is biased to return to its position in the path of the rocker member, and in which means are provided manually to raise the rocker member when it is desired to remove the cartridge whereupon the automatic return movement of the stop member will eject the cartridge while preventing return swinging of the rocker member.

7. A structure as described in claim 6 in which said manual means includes a linkage connected with said shaft and a control member on said panel movable to rotate said shaft in a direction swinging the rocker member from said panel.

8. In a device of the character described in which there is a tape drive capstan, a pressure roller engaged against the tape drive capstan with a tape member between so that rotation of the capstan causes transportation of the tape, a lever mounting the pressure roller and biased in a direction to force the pressure roller against the drive capstan, a rotating drive system coupled with the drive capstan and including a continuously rotating member, a fast wind capstan, a rotation transfer mechanism connected to rotate the fast wind capstan but maintaining the fast wind capstan normally disposed spaced from the pressure roller when the rotation transfer mechanism is inoperative, the rotation transfer mechanism including a movable link having a friction wheel mounted thereon connected with the fast wind capstan, the link being mounted for translative movement in a plane, and an actuating member for moving said link to carry the friction wheel into engagement with the continuously rotating member and thereafter to move the link in a direction to press the fast wind capstan against the pressure roller without disconnection of the friction wheel from the continuously rotating member, and means swinging the lever mounting the pressure roller away from the tape drive capstan prior to engagement between the fast wind capstan and the pressure roller.

9. In a device of the character described in which there is a tape drive capstan, a pressure roller engaged against the tape drive capstan with a tape member between so that rotation of the capstan causes transportation of the tape, a lever mounting the pressure roller and biased in a direction to force the pressure roller against the drive capstan, a rotating drive system coupled with the drive capstan and including a continuously rotating member, a fast wind capstan, a rotation transfer mechanism connected to rotate the fast wind capstan but maintaining the fast wind capstan normally disposed spaced from the pressure roller when the rotation transfer mechanism is inoperative, the rotation transfer mechanism including a movable link having a friction wheel mounted thereon connected with the fast wind capstan, the link being mounted for translative movement in a plane, and an actuating member for moving said link to carry the friction wheel into engagement with the continuously rotating member and thereafter to move the link in a direction to press the fast wind capstan against the pressure roller without disconnection of the friction wheel from the continuously rotating member, and means swinging the lever mounting the pressure roller away from the tape drive capstan prior to engagement between the fast wind capstan and the pressure roller, comprising an extension connected with said link and pressing against said lever mounting said pressure roller during movement of said link.

10. In a tape transporting device for use with a cartridge having a coil of magnetic tape and means supporting a section of said tape to expose the section in operative position, and said device including an electromagnetic head and means including an electric motor for driving the tape past the head; a single control member adapted to be disposed in a plurality of different positions while said cartridge is operatively attached to said device, one of which is a neutral position in which the tape driving means is inoperative, a second of which energizes said tape driving means, and a third of which energizes a second tape driving means, said tape section being engaged against said magnetic head while said control member is in said second position, and means operable by said control member when moved to said third position to space said tape section from said head to permit free tape transportation in said third position.

11. In a tape transporting device for use with a cartridge having a coil of magnetic tape and means supporting a section of said tape to expose the section in operative position, and said device including an electromagnetic head and means including an electric motor for driving the tape past the head; a single control member adapted to be disposed in a plurality of different positions while said cartridge is operatively attached to said device, one of which is a neutral position in which the tape driving means is inoperative, a second of which energizes said tape driving means, and a third of which energizes a second tape driving means, said tape section being engaged against said magnetic head while said control member is in said second position, and means operable by said control member when moved to said third position to space said tape section from said head to permit free tape transportation in said third position, said second tape driving means having coupling with said motor for transporting the tape at a different speed than the first tape driving means.

12. In a tape transporting device for use with a cartridge having a coil of magnetic tape and means supporting a section of tape to expose said section in operative position, said device including means to hold said cartridge in position to transport the section of tape past an electromagnetic head, tape pressing means for causing the section to be engaged against said electromagnetic head in proper polar relationship therewith, an electric motor, a first tape driving means and a second tape driving means; a single multiple position control member having a neutral position in which said section is spaced from said head and neither tape driving means is coupled with said motor, a first speed position in which only said first tape driving means is coupled with said motor and said section of tape is engaged against said head, and a wind position in which only said second tape driving means is coupled with said motor and said section is spaced from said head, and mechanical means connected with said control member to effect the coupling and decoupling of said tape driving means relative the motor and the operation of said tape pressing means while being moved between positions.

13. A structure as claimed in claim 12 in which there is a second speed position of said control member in which only said first tape driving means is coupled with said motor and said section is engaged against said head, and in which there is a speed change mechanism actuated when said control member is moved to said second speed position.

14. A structure as claimed in claim 13 in which the control member is movable from position to position in the consecutive order: neutral, first speed, second speed and wind.

15. In a tape transporting mechanism for cooperating with a cartridge having a magnetic member coiled therein with a rectilinear section of said member adapted to be disposed in operative position for movement past a magnetic head; cartridge holding means comprising a platform upon which said cartridge is adapted to be disposed in operative position, a jaw swingable relative said platform between a first position in which the free end of the jaw is spaced from the platform sufficient to permit insertion of the cartridge in a sliding movement along the platform toward the angle formed between the jaw and platform, and a second position in which free end of the jaw is substantially closer to said platform than it is in said first position, means biasing the jaw to move from said first to said second position, latch means holding said jaw in said first position but releasable upon said manual insertion of said cartridge, and means operable by said jaw upon movement to said second position to lock said cartridge upon said platform with said rectilinear section in operative position.

16. A structure as claimed in claim 15 in which means are provided to eject said cartridge when said jaw is moved from said second to said first position.

17. A structure as claimed in claim 15 in which spring loaded ejection means are provided for ejecting the cartridge when said jaw is moved from second to first position, the said insertion of said cartridge serving to spring load said ejection means but the said jaw having means preventing ejection while in said second position, and means for manually moving the jaw from second to first position.

18. In a tape transporting device for cooperating with a cartridge having a coil of magnetic tape therein with a rectilinear section adapted to be presented to an electromagnetic head and to tape driving means to move the tape past the head and the device having control means for operating said tape driving means; cartridge holding and ejecting means comprising a platform along which said cartridge is adapted to be moved to operative position relative said head and driving means in a sliding movement, a rocker member pivotally secured at one end to swing relative said platform and biased to having its free end move toward the platform, spring-pressed means latching the rocking member with its free end spaced from said platform to form an angle therewith, the cartridge engaging said spring-pressed means when moved into said angle and unlatching said rocker member to permit said swinging movement of said rocker member to close said angle, means operated by said rocker member to secure said cartridge in said operative position when said free end has moved toward said platform, and means for raising said rocker member against its bias whereby to release said spring-pressed means for movement to latch the rocker member as aforesaid, said last movement of said spring-pressed means also serving to eject said cartridge from said operative position.

19. A structure as claimed in claim 18 in which the means for raising the rocker member is operated by said control member.

20. In a tape transporting device for use with a cartridge having a coil of magnetic tape and means supporting a section of said tape to expose said tape in operative position, and said device including an electromagnetic head and means including an electric motor for driving the tape past the head; means manually operable to clamp said cartridge in operative position, a single control member adapted to be disposed in a neutral position in which the tape driving means is inoperative, a tape drive position in which said tape driving means is operative to transport said tape, a second tape drive position in which said tape driving means is operative to transport said tape at a speed different from that of said first position, or a cartridge unclamping and ejecting position at which said tape driving means is inoperative, the clamping means is rendered inoperative, and means actuated to push the cartridge out of operative position.

21. A structure as claimed in claim 20 in which the cartridge unclamping and ejecting position and the neutral position are adjacent one another, and the control member is biased to return to said neutral position if moved to said unclamping and ejecting position.

22. In a device of the character described in which there is a tape driving mechanism including a rotating drive capstan, a source of rotary movement, and a flexible drive member for transmitting the rotary movement of the source to the drive capstan; a pulley having two steps of different diameter coupled with said source, a control member adapted to be manually moved to one of two positions and means actuated by said control member engaging the drive member to shift same between said steps to change the speed of said drive capstan between said two positions.

23. In a device of the character described in which there is a tape driving mechanism including a fast wind capstan and a tape drive capstan, a source of rotary movement, first means coupling the source with said fast wind capstan, and second means coupling the source with said first tape drive capstan; a single rotary, manual control member rotatable to one of two positions, linkage connections rendering one coupling means operative and the other inoperative during rotary movement between said positions.

24. A structure as claimed in claim 23 in which there is a tape seizing means also operated by said rotary movement of said manual control member and being rendered inoperative when said control member is moved to the position at which said fast wind capstan is coupled to said source.

25. In a tape transporting device for use with a cartridge having a coil of magnetic tape and means supporting a section of said tape to expose the section in operative position, and the said device including an electromagnetic head and means for driving the tape past the head; cartridge holding means comprising a platform upon which said cartridge is adapted to be disposed in operative position, a jaw swingable relative said platform between a first position in which the free end of the jaw is spaced from the platform sufficient to permit insertion of said cartridge upon said platform in the angle formed between the jaw and platform, and a second position in which the free end of the jaw is substantially closer to the platform than it is in said first position, means biasing said jaw to move between said positions, means retaining said jaw in said first position and adapted to be rendered inoperative when the jaw is to be moved to said second position, and means operable by said jaw upon movement to said second position to lock said cartridge upon said platform with said section in operative position.

26. A structure as claimed in claim 25 in which said tape driving means include a pressure roller and a drive capstan adapted to be moved together to seize the tape therebetween when said section is in operative position, and means are provided to move said roller and capstan together when the jaw is moved from first to second position and apart when the jaw is moved from second to first position.

27. A structure as described in claim 26 in which said last mentioned means includes a manually operable member pivotally mounted relative said platform and said biasing means comprises a tension member operably connected between said jaw and platform.

References Cited in the file of this patent

UNITED STATES PATENTS

| | | |
|---|---|---|
| 2,167,817 | Smith | Aug. 1, 1939 |
| 2,778,636 | Eash | Jan. 22, 1957 |
| 2,778,637 | Eash | Jan. 22, 1957 |
| 2,778,880 | Eash | Jan. 22, 1957 |
| 2,781,019 | Tiger | Feb. 12, 1957 |

OTHER REFERENCES

Magnetic Film and Tape Recording Magazine, April 1955, p. 29.